Nov. 3, 1964   G. BONMARTINI   3,155,436
PNEUMATIC TUBULAR TRACK, DRIVING AND CARRYING DEVICE
Filed March 11, 1963   7 Sheets-Sheet 1
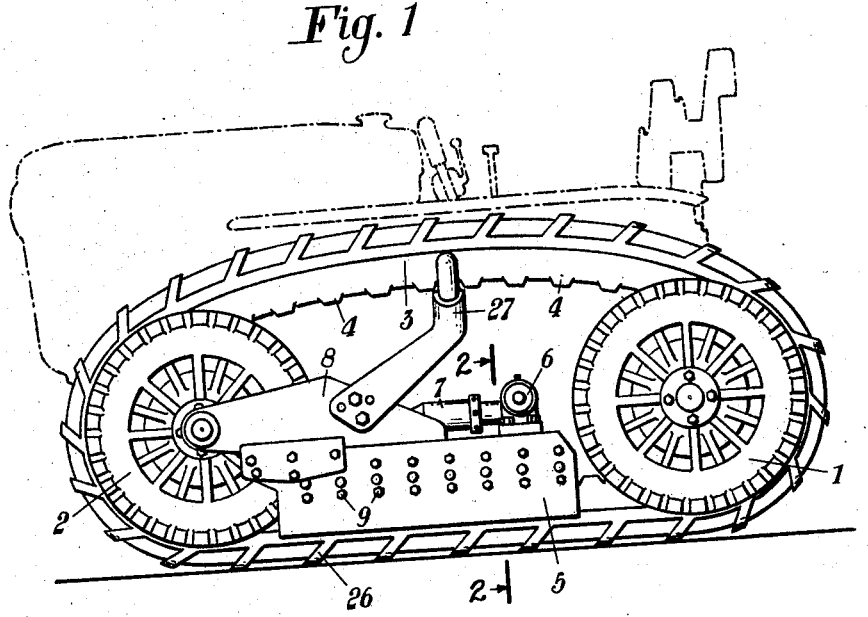
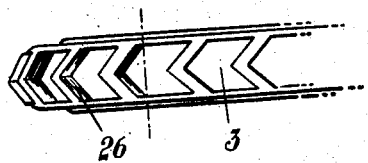
INVENTOR.
Giovanni Bonmartini,
BY Nov. 3, 1964    G. BONMARTINI    3,155,436
PNEUMATIC TUBULAR TRACK, DRIVING AND CARRYING DEVICE
Filed March 11, 1963    7 Sheets-Sheet 2

INVENTOR.
Giovanni Bonmartini,
BY

Nov. 3, 1964 — G. BONMARTINI — 3,155,436
PNEUMATIC TUBULAR TRACK, DRIVING AND CARRYING DEVICE
Filed March 11, 1963 — 7 Sheets-Sheet 3

INVENTOR.
Giovanni Bonmartini
BY Robert Burns

Nov. 3, 1964  G. BONMARTINI  3,155,436
PNEUMATIC TUBULAR TRACK, DRIVING AND CARRYING DEVICE
Filed March 11, 1963  7 Sheets-Sheet 4

INVENTOR.
Giovanni Bonmartini
BY

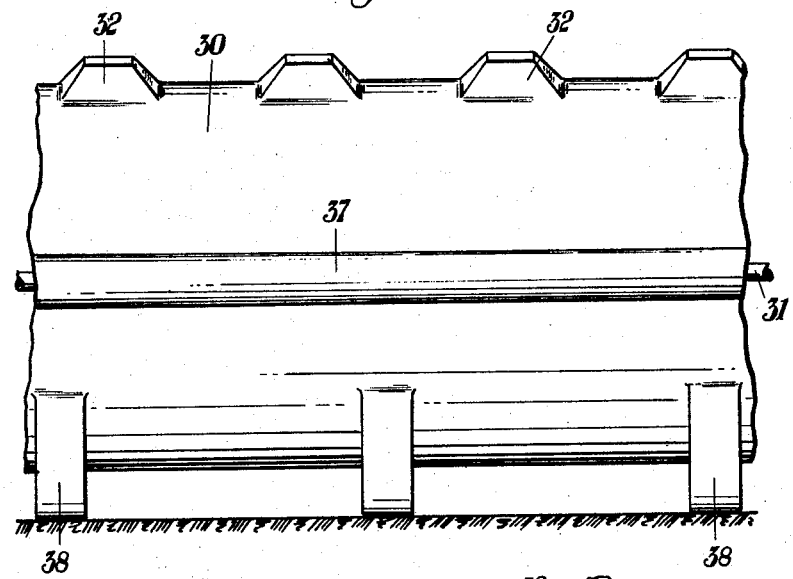
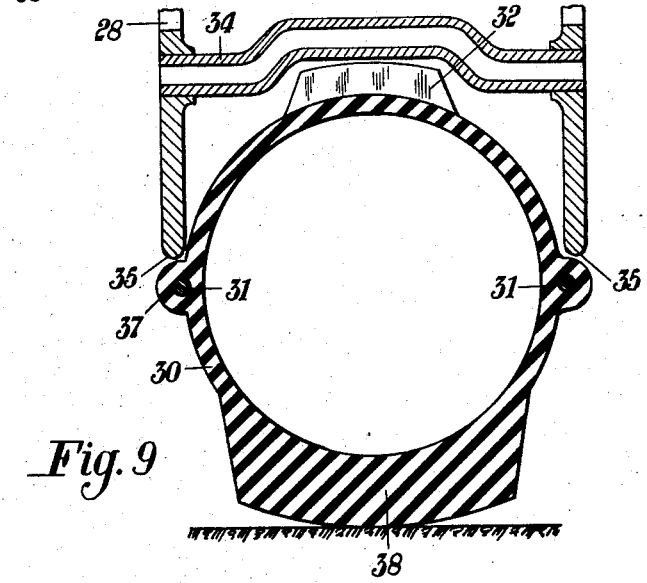

Nov. 3, 1964 G. BONMARTINI 3,155,436
PNEUMATIC TUBULAR TRACK, DRIVING AND CARRYING DEVICE
Filed March 11, 1963 7 Sheets-Sheet 6

INVENTOR.
Giovanni Bonmartini
BY

United States Patent Office 3,155,436
Patented Nov. 3, 1964

3,155,436
PNEUMATIC TUBULAR TRACK, DRIVING AND
CARRYING DEVICE
Giovanni Bonmartini, 2 Via San Teodoro, Rome, Italy
Filed Mar. 11, 1963, Ser. No. 264,339
Claims priority, application Italy, Mar. 17, 1962, 69/90;
Oct. 25, 1962, 77/408; Feb. 9, 1963, 82/16
10 Claims. (Cl. 305—13)

The present invention relates to a pneumatic tubular track driving and carrying device, for tracked vehicles, of the type wherein means are provided from improving the drive of the track.

As it is known, the pneumatic tubular tracks are particularly used as parts of carrying mechanisms for vehicles generally, (i.e. for aircraft, land and amphibious vehicles) for which the adherence between the track and the vehicle wheels, with which the track co-operates, is normally sufficient to satisfy the required service conditions. The tubular pneumatic track is also suitable to transmit the motive power from the engine vehicle to the ground. However, when large stresses are to be transmitted to the ground from the engine through the track, the latter tends to slide on the driving wheel (or on the driving wheels), reducing thereby the efficiency of the machine. For instance, in a tractor, i.e. in a vehicle which by its own nature, runs under a high tractive stress, a tubular track having a smooth surface contacting the driving wheels is inadequate.

It has been proposed, in this connection, a positive engagement, like that of a toothed wheel, between the innerside of a very flattened track and the driving wheel (or wheels).

The embodiment of a track of this kind is cumbersome and expensive; moreover, the meshing of the track teeth with the toothed wheel can suffer certain inconveniences when the vehicle runs off the road, due to insertion of mud, stones and other materials.

According to this invention a pneumatic tubular track tractive and load bearing device is proposed for tracked vehicles comprising, in combination, two drums, at least one of which is a driving drum, located in a same plane, a substantially round cross-section pneumatic tubular track wound about said drums, projections spaced apart on the inner surface of said tubular member i.e. on that surface which contacts said drums, separate thrust members carried by the motive drum, spaced apart to the same extent as said projections and so located that during the movement, said members will insert between two sequential projections, resting against the side of one of them, and means to maintain any cross-section of said tubular track substantially at its correct position.

A tubular member of this kind can be embodied by known techniques, due to its substantially circular cross-section which is maintained throughout its length. It will be sufficient, in order to enable it to its service, to render the tubular member inextensible or practically inextensible, preferably in its innerside portion. It is of the tubeless type, so that it can be repaired. Moreover, the thrust members can be embodied by means of simple spaced apart cross members, so that any meshing misfunction will be avoided due to insertion of extraneous matters between the teeth of the motive wheel and the teeth of the track. Notwithstanding this simple embodiment of the device it has been surprisingly found that the meshing is correct and effective.

As the lengthwise inextensible zone of the track 13 located in the inner part of the track itself, the track unit will be easily deflected by twist or bending deflections in the portions extending between the driving or bearing wheels. According to this invention the tendency to deformation of the track will be corrected by the use of rest rollers carried by the tracked vehicle, said rollers being located with their axes askew with respect to the ground and contained in planes at right angles to the axis of said track portion extending between said driving or bearing wheels so as to maintain the cross section of the track substantially at its correct position and simultaneously to exert a thrust towards the rest direction on the ground, so as to cause the entire portion of the track contacting the ground to work as a rest member.

This invention is illustrated by way of example in the attached drawings showing certain preferred embodiments, wherein:

FIG. 1 shows a side elevational view of the entire device;

FIG. 6 is a fragmentary bottom view of the tubular track shown in FIGURE 1;

FIG. 8 shows an enlarged view of a portion of the track of FIG. 7 when resting on the ground;

FIG. 9 is a sectional view in an enlarged scale, taken along the line 9—9 of FIG. 7;

Figure 2:
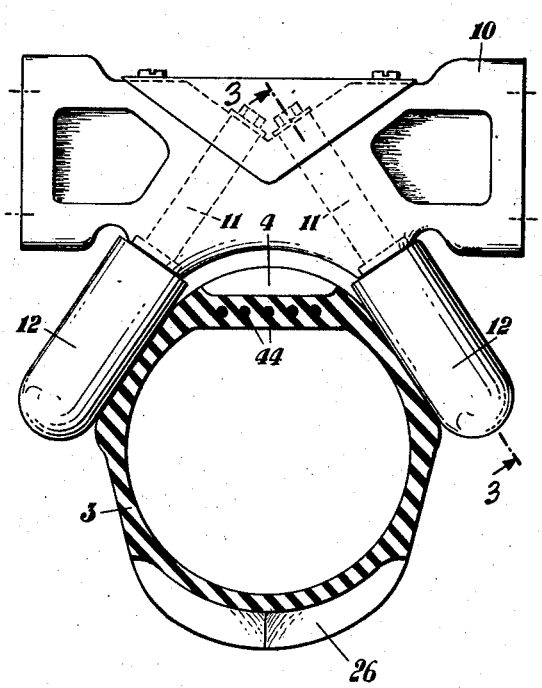
FIG. 2 shows the cross-sectional view taken along the line 2—2 of FIG. 1.

With reference to the drawing, the device shown in FIGS. 1 to 6 consists of two drum shaped wheels 1 and 2, where about is wound the tubular track 3 having a substantially circular cross-section with an inextensible reinforcement 44. The track 3 is provided with the innerside projections 4 designed to co-operate with corresponding members carried by the driving drum 1 and by the idler drum 2. Onto the run of the track resting on the ground, bears a set of rollers carried by the casing 5 connected to the stud 6 fixed to the vehicle. This stud 6 itself supports the reaction of the shaft 7 pushing the drum 2 mounted on the fork member 8. This fork member is provided with one or more adjustable roller stretchers like that shown by way of example at 27.

This location of the rollers obtains: (a) the maintenance of the tubular in its correct position, and (b) the pressure onto the ground of the lower portion of the track extending between the terminal wheels. The rollers could also be fixed on their axes, rotatable in the support.

Figure 3:
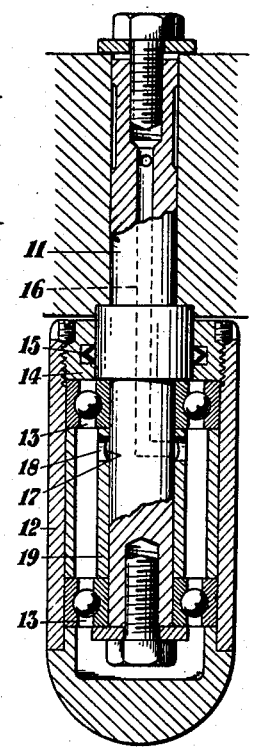
FIG. 3 shows the detail of a roller in axial sectional view taken on the line 3—3 in FIG. 2.

Within the casing 5 is mounted, in register with the bolts 9, a set of rectangular pieces 10 wherein are obliquely mounted the pivot pins 11 carrying the rollers 12 (FIG. 2). As seen in FIG. 3, each roller 12 is cup shaped and mounted on two ball bearings 13. A bushing 14 provided with a sealing means 15 secures in place the cup member 12. The lubrication is ensured by means of the bore 16 in the pivot pin 11 and the channel 17 with bores 18 in the spacer 19. As no thermal stress is present, the cup could also be made of synthetic resin.

Figure 4:
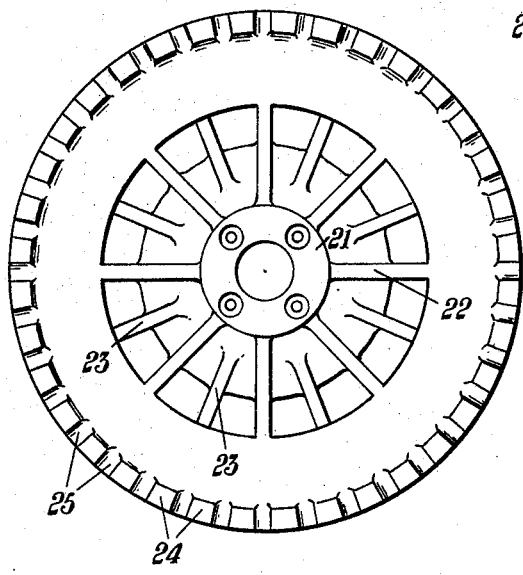
FIG. 4 shows the detail of a wheel in side elevational view.
Figure 5:
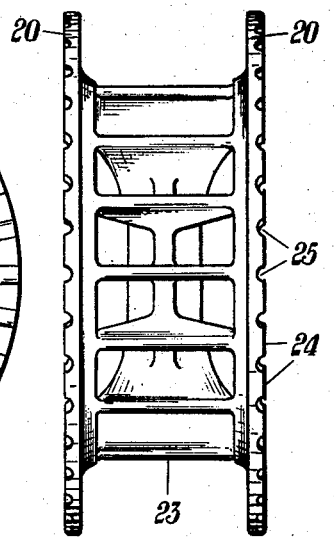
FIG. 5 shows the detail of a wheel in front elevational view.
Figure 7:
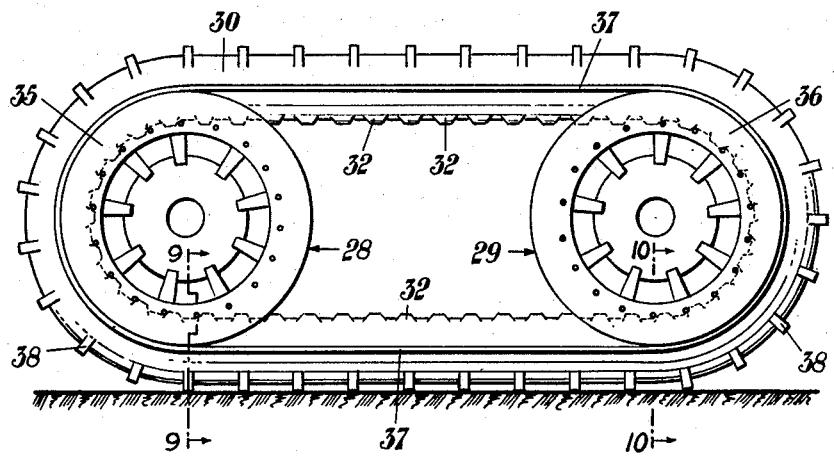
FIG. 7 shows a side elevational view of another embodiment of the device according to the present invention.
Figure 10:
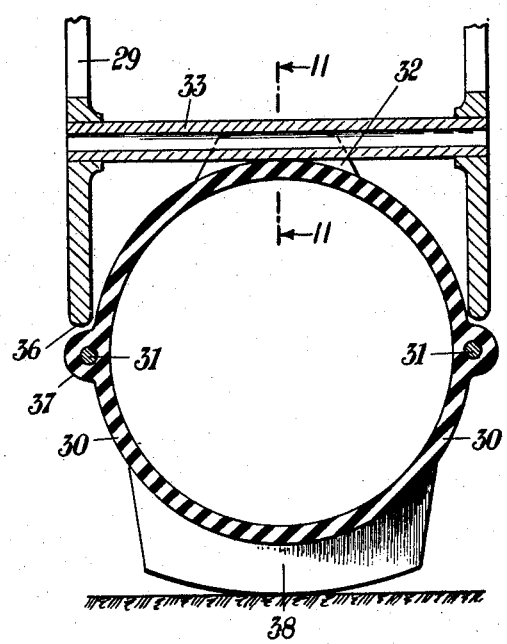
FIG. 10 is a sectional view in an enlarged scale taken along the ilne 10—10 of FIG. 7.
Figure 12:
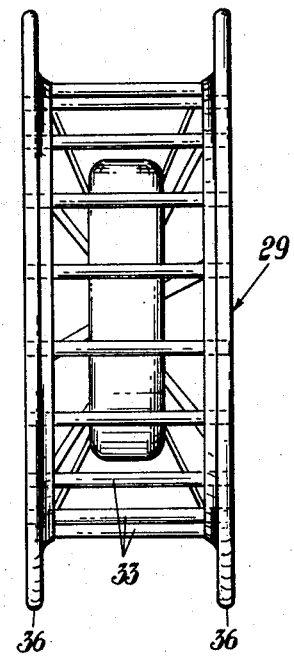
FIG. 12 is an end view of a driving drum for the track according to the present invention.

As shown in detail in FIGS. 4 and 5, the drums 1 and 2 consist of two flanges 20 connected to the hub 21 by means of the spokes 22 and to one another by means of the radial diaphragms 23 which at their outer ends form the members co-operating with the projections 4 of the track 3.

The flanges 20 are provided at their outer periphery with projecting members 24 and recesses 25 which when the drum is in a deep furrow, can be considered as cutting the sides of the furrow preparing thus for the track the way to overcome the obstacle.

As shown particularly in FIG. 6 the track is provided in its outer part with ground grasping fins, in the form of projecting heels 26 which seen in top plane view have a V-shape. The direction shown in the drawings for these fins is merely indicative.

Figure 11:
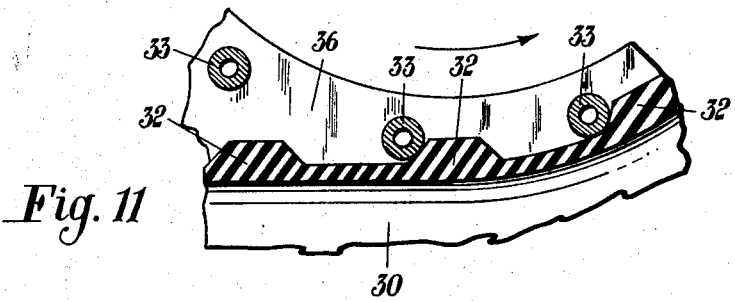
FIG. 11 is a cross sectional view taken along the line 11—11 of FIG. 10.

With reference to FIGS. 7 to 12, the device comprises two drums 28 and 29, and a pneumatic tubular track 30 having a substantially circular cross sectional shape wound around said drums. The pneumatic tubular member 30, provided in a way known per se, with a metal reinforcement (or made of any other equivalent material) 31, is provided in its innerside surface, i.e. on that surface which is turned towards the carrying drum 28 and the driving drum 29, with a set of projections 32 suitable to co-operate with the cross members 33 of the drum 29 (FIG. 10) however with no contact with the bent cross-members 34 of the drum 28 (FIG. 9). The flanges 35 and 36 of the drums 28 and 29 co-operate with the ribs 37 laterally projecting from the track 30 and containing the reinforcements 31. The cylindrical cross members 33 of the driving wheel 29 can be adapted to rotate about their axes, so as to render easy the engagement and the co-operation with the projections 32 of the track 30. As seen in FIG. 11 the cross members do not fill entirely the space bettween the projections 32 and leave a large space therebetween; moreover the drum 28 or 29 is internally hollow so that any possibility of drawback to meshing is excluded, due to the insertion of extraneous matters between the track and the driving members.

To the outer side of the track 1, i.e. to that part which comes into contact with the ground are applied the grasp fins 38 in order to promote the ground grasping. The fins 38 as well as the teeth 32 can be obtained either bodily with the elastic material forming the track 30 or said fins and teeth can be applied to the track.

Figure 13:
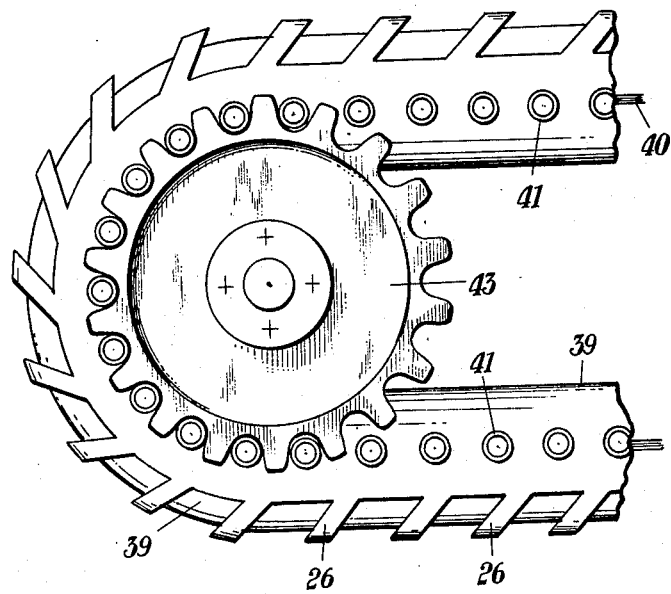
FIG. 13 is a side elevational view of a further embodiment of this invention.
Figure 14:
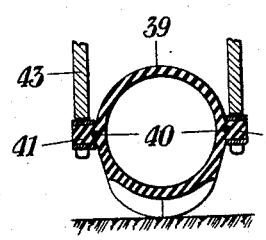
FIGS. 14 and 15 show the cross sectional views of two different tracks suitable for the device of FIG. 13.
Figure 15:
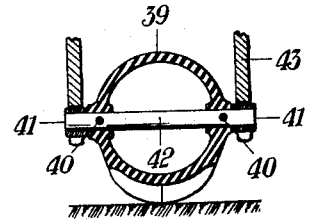

FIGS. 13, 14 and 15 show a track 39 provided with two intermediate lateral cables 40 and in register therewith, outer projections 41 being either integral with the track as shown in FIG. 14, or forming the outer ends of a cross member 42. The projections 41 are engaged by the teeth of one or more driving and/or locating wheels 43.

I claim:

1. In a track-laying vehicle having a frame, the combination of two spaced rotating drums located in the same plane, means for driving at least one of said drums, each of said drums comprising axially spaced flanges and means connecting said flanges at circumferentially spaced intervals while leaving open spaces between said intervals, an endless pneumatic track of tubular cross-section running on said drums and having side portions engaging said spaced flanges to support said track on said drums while leaving a central inner portion of said tubular track free of said drums and unconfined to avoid entrapping foreign material between said track and drums, spaced projections on said track, means on said driving drum engaging said projections to provide a positive driving connection between said driving drum and track and at least one pair of rollers mounted on said vehicle between said drums, the rollers of a pair being rotatable about axes disposed at an angle to one another and positioned to engage side portions of said tubular track to resist twisting and bending deflection of said track between said drums.

2. A combination according to claim 1, in which the means connecting said flanges of said driving drum comprise circumferentially spaced cross members which constitute said means engaging projections on said tubular track to provide a positive driving connection between said drum and track.

3. A combination according to claim 2, in which said cross members are of cylindrical cross-section.

4. A combination according to claim 1, in which one of said drums is an idler and in which said means connecting said axially spaced flanges of said idler drum are out of engagement with said tubular track.

5. A combination according to claim 1, in which a plurality of pairs of said rollers are provided between said drums and are mounted on a common structure articulatedly mounted on the frame of said vehicle.

6. In a vehicle having pneumatic tubular tracks, a driving drum and an idler drum carrying the tubular track, a supporting system for the tubular track comprising in combination a fork member carrying said idler drum, at least one adjustable roller stretcher engaging the upper run of the tubular track and secured to said fork member, a stud fixed to the vehicle, a casing pivotally connected to said stud and bearing said fork member, a shaft engaging at one end said fork member and at the other end said stud, a set of roller means arranged in said casing for engaging the lower run of the tubular track resting on the ground, whereby possible twist and bending deflections of the tubular track will be avoided for maintaining a substantially correct position thereof and for exerting a thrust on said tubular track in the direction of the ground.

7. In a vehicle having penumatic tubular tracks, a driv-drum and an idler drum carrying the tubular track, said drums consisting each of two annular flanges having at their outer periphery a plurality of equispaced recesses, a hub for supporting said flanges, a plurality of equispaced spokes connecting said flanges with said hub, a plurality of cross members connecting said flanges one with another, said pneumatic tubular tracks having at their drum engaging side a plurality of projections cooperating with said cross members to enter within the free spaces formed therebetween and on their ground engaging side a plurality of V-shaped projecting treads, tensioning means for the tubular track comprising in combination a fork member carrying said idler drum, at least one adjustable roller stretcher engaging the upper run of the tubular track and secured to said fork member, a stud fixed to the vehicle, a casing pivotally connected to said stud and bearing said fork member, a shaft engaging at one end said fork member and at the other end said stud, a set of roller means arranged in said casing for abutting the lower run of the tubular track resting on the ground whereby possible twist and bending deflections of the tubular track will be avoided for maintaining a substantially correct position thereof and for exerting a thrust on said track towards the ground.

8. In a vehicle having pneumatic tubular tracks, a driving drum and an idler drum carrying the tubular track, tensioning means for the tubular track comprising in combination a fork member carrying said idler drum, at least one adjustable roller stretcher engaging the upper run of the tubular track and secured to said fork member, a stud fixed to the vehicle, a casing pivotally connected to said stud and bearing said fork member, a shaft engaging at one end said fork member and at the other end said stud, a set of roller means arranged in said casing for abutting the lower run of the tubular track resting on the ground, said roller means consisting of a set of rectangular elements rigidly fixed within said casing, a pair of pivot pins arranged askew one to another in each of said rectangular elements and having a central lubrication bore, a lower ball bearing and an upper ball bearing both mounted on each of said pivot pins and lubricated by said central bore, a pair of cup shaped rollers mounted on said upper and lower ball bearing to rotate around said pivot pins, a bushing closing the open end of said roller and a gasket provided within said bushing, whereby possible twist and bending deflections of the tubular track will be avoided for maintaining a substantially correct position thereof and for exerting a thrust towards the rest direction of the tubular track on the ground.

9. In a track-laying vehicle having a frame, the combination of two spaced rotating drums located in the same plane, means for driving one of said drums, each of said drums comprising axially spaced flanges and cross members connecting said flanges at circumferentilly spaced intervals while leaving open spaces between said intervals, an endless pneumatic track of tubular cross-section running on said drums and having side portions engaging said spaced flanges to support said tubular track on said drums, said tubular track also having on its inner periphery longitudinally spaced projections engageable with said cross members of said driving drum to provide a positive driving connection between said driving drum and track, a supporting structure articulatedly mounted on said vehicle frame between said drums and between the upper and lower runs of said track and roller means rotatably supported on said structure and engaging said side portions of both the upper and lower runs of said track between said drums to guide and support said track.

10. A combination according to claim 9, in which said rollers are arranged in pairs with the rollers of a pair rotatable about axes disposed at an angle to one another in the form of a V.

References Cited by the Examiner
UNITED STATES PATENTS

| | | | |
|---|---|---|---|
| 1,391,184 | 9/21 | Grupe | 74—240 |
| 2,661,251 | 12/53 | Bonmartini | 305—34 |
| 2,713,521 | 7/55 | Curtis | 305—34 |
| 2,886,378 | 5/59 | Anderson | 305—34 |
| 2,987,347 | 6/61 | Cook et al. | 305—34 X |
| 3,082,044 | 3/63 | Klemm et al. | 305—34 X |

ARTHUR L. LA POINT, *Primary Examiner.*